United States Patent
Kimura et al.

(10) Patent No.: US 7,983,256 B2
(45) Date of Patent: Jul. 19, 2011

(54) BROADCAST-CONTENT TRANSMITTING APPARATUS, BROADCAST-CONTENT RECEIVING APPARATUS, BROADCAST-CONTENT TRANSMITTING METHOD, BROADCAST-CONTENT RECEIVING METHOD, AND PROGRAM

(75) Inventors: Hiroaki Kimura, Tokyo (JP); Shingo Izawa, Tokyo (JP); Tsunemichi Ozaki, Yokohama (JP); Noriaki Konishi, Yokohama (JP)

(73) Assignee: KDDI Corporation, Tokyo (JP)

( * ) Notice: Subject to any disclaimer, the term of this patent is extended or adjusted under 35 U.S.C. 154(b) by 318 days.

(21) Appl. No.: 12/160,028

(22) PCT Filed: Dec. 27, 2006

(86) PCT No.: PCT/JP2006/326128
§ 371 (c)(1),
(2), (4) Date: Jul. 3, 2008

(87) PCT Pub. No.: WO2007/077891
PCT Pub. Date: Jul. 12, 2007

(65) Prior Publication Data
US 2009/0290581 A1    Nov. 26, 2009

(30) Foreign Application Priority Data
Jan. 5, 2006    (JP) .................... 2006-000595

(51) Int. Cl.
*H04L 12/28* (2006.01)

(52) U.S. Cl. ..................................... 370/389

(58) Field of Classification Search .............. 370/389
See application file for complete search history.

(56) References Cited

U.S. PATENT DOCUMENTS

| | | | |
|---|---|---|---|
| 6,321,383 B1 * | 11/2001 | Funahashi et al. | 725/92 |
| 6,871,002 B1 | 3/2005 | Saito | |
| 2003/0162495 A1 * | 8/2003 | Yonemoto et al. | 455/7 |
| 2007/0242701 A1 * | 10/2007 | Lee et al. | 370/487 |

FOREIGN PATENT DOCUMENTS

| | | |
|---|---|---|
| JP | 2000-031921 A | 1/2000 |
| JP | 2000-078830 A | 3/2000 |

OTHER PUBLICATIONS

Network Working Group Request for Comments: 4259 on Nov. 2005.*

(Continued)

*Primary Examiner* — Ayaz R Sheikh
*Assistant Examiner* — Hai-Chang Hsiung
(74) *Attorney, Agent, or Firm* — Westerman, Hattori, Daniels & Adrian, LLP

(57) ABSTRACT

A broadcast-content transmitting apparatus includes a content input unit (201) that receives frame data including a broadcast content and a ULE encapsulating unit (203) that performs a predetermined encapsulation process on the input frame data. The transmitting apparatus further includes an SNDU→DDB unit (212) or an SNDU→MODULE unit (213) that form the encapsulated frame data into a DDB, which is a predetermined block unit, generate a DII, which is information concerning the DDB, and output the DDB and the DII as a section based on a predetermined data carousel scheme and a transmitting unit (204) that transmits the section output from the SNDU→DDB unit (212) or the SNDU→MODULE unit (213) to a terrestrial digital broadcasting network.

7 Claims, 12 Drawing Sheets

OTHER PUBLICATIONS

Notification of Transmittal of Translation of the International Preliminary Report on Patentability (Form PCT/IB/338) of International Application No. PCT/JP2006/326128 mailed Jul. 17, 2008 with Forms PCT/IB/373 and PCT/ISA/237.

M.-J. Montpetit et al. [RFC 4259] "A Framework for Transmission of IP Datagrams over MPEG-2 Networks", [online]. The Internet Engineering Task Force, Nov. 2005, [retrieved on Jan. 23, 2007]; retrieved form the Internet: <URL:http://tools.ietf.org/html/rfc4259>.

G. Fairhurst et al. [RFC 4326] "Unidirectional Lightweight Encapsulation (ULE) for Transmission of IP Datagrams over an MPEG-2 Transport Stream (TS)," [online], The Internet Engineering Task Force, Dec. 2005, [retrieved on Jan. 23, 2007], Retrieved from the Internet: <URL://tools.ietf.org/html/rfc4326>.

Shigeaki Hakusui, "Hoso Denpa no IP-ka o Hoso to Tsushin no Kozo kara Kangaeru", New Media, New Media Co., Ltd., Aug. 1, 2005 pp. 7 to 9.

Mahesh Sooriyabandara et al. "Alightweight encapsulation protocal for IP over MPEG-2 networks: design, implementation and analysis," Computer Networks, Elsevier Science Publishers B.V., May 16, 2005, vol. 48, Issue 1, p. 5-19.

International Search Report of PCT/JP2006/326128; date of mailing Jan. 30, 2007.

Crinon R J: "The DSM-CC Object Carousel for Broadcast Data Services" 19970611; 19970611-19970613, Jun. 11, 1997, pp. 246-247, XP010250059.

European Search Report dated Mar. 29, 2010, issued in corresponding European Patent Application No. 06843510.

Kou-Sou, Kan et al.: "Real-Time MPEG Video Over Lan with DSM-CC Signaling" Proceedings of The Spie—The International Society for Optical Engineering, SPIE, US, vol. 3024, No. Part 01, Feb. 12, 1997, pp. 526-536, XP000675531.

Ladebusch U: "Einfuehrung in Den DVB-Datenrundfunk" FKT Fernseh und Kinotechnik, Fachverlag Schiele & Schon GMBH., Berlin, DE vol. 52, No. 7, Jul. 1, 1998, pp. 425-432, XP000870644.

Stuart Pekowsky et al.: "Multimedia Data Broadcasting Strategies" IEEE Communications Magazine, IEEE Service Center, Piscataway, US, vol. 39, No. 4, Apr. 1, 2001, pp. 138-145, XP011091463.

Teh Chee Hong et al.: "A comparison of IP datagrams transmission using MPE and ULE over MPEG-2/DVB networks"; 2005 5th International Conference on Information Communications and Signal Processing Dec. 6-9, 2005 Bangkok, Thailand, p. 5 PP., 2005 5th International Conference on Information Communications and Signal Processing.

\* cited by examiner

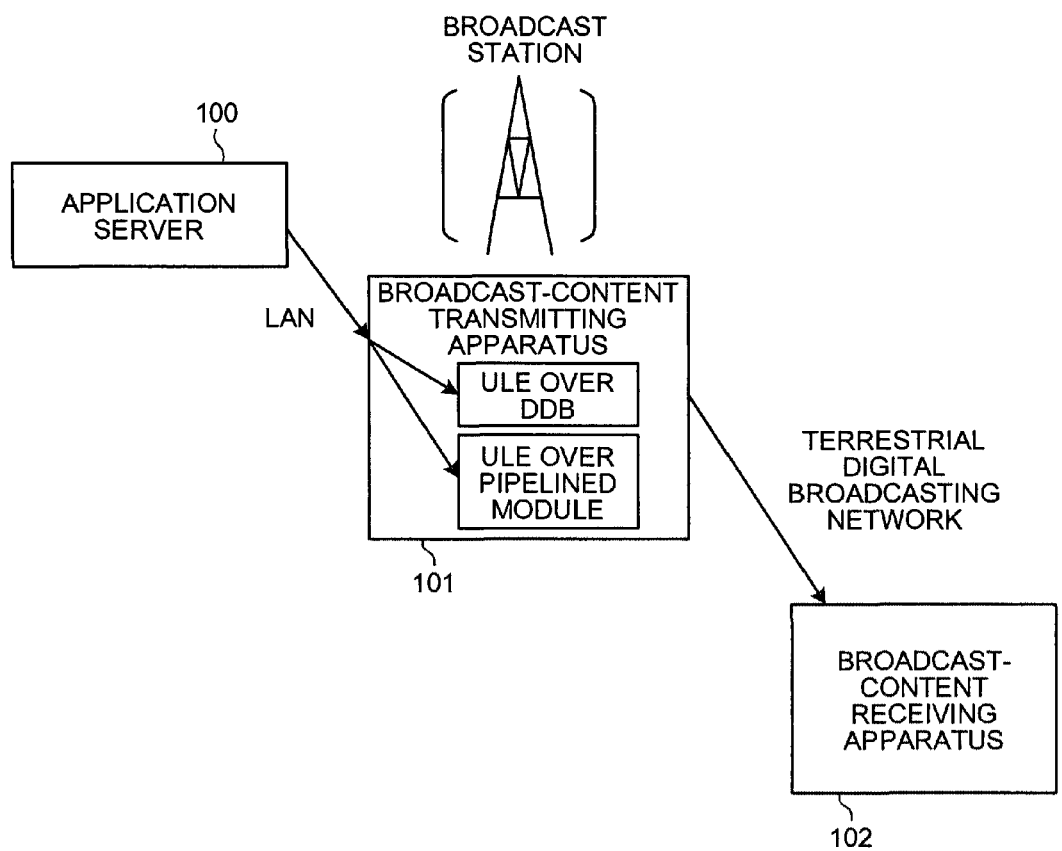

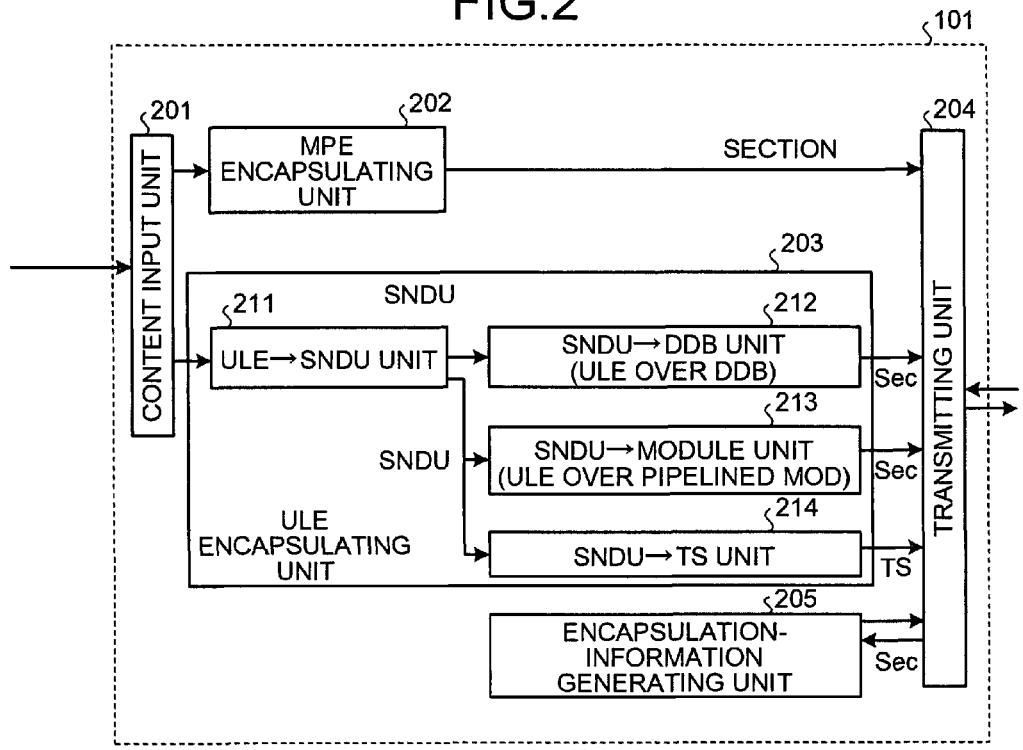
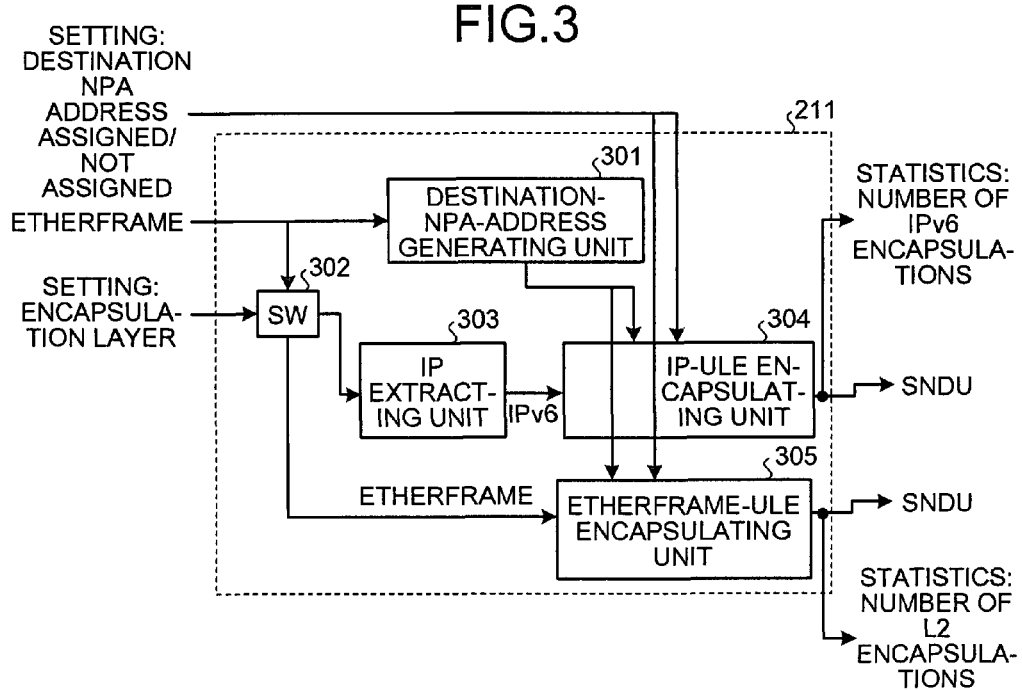

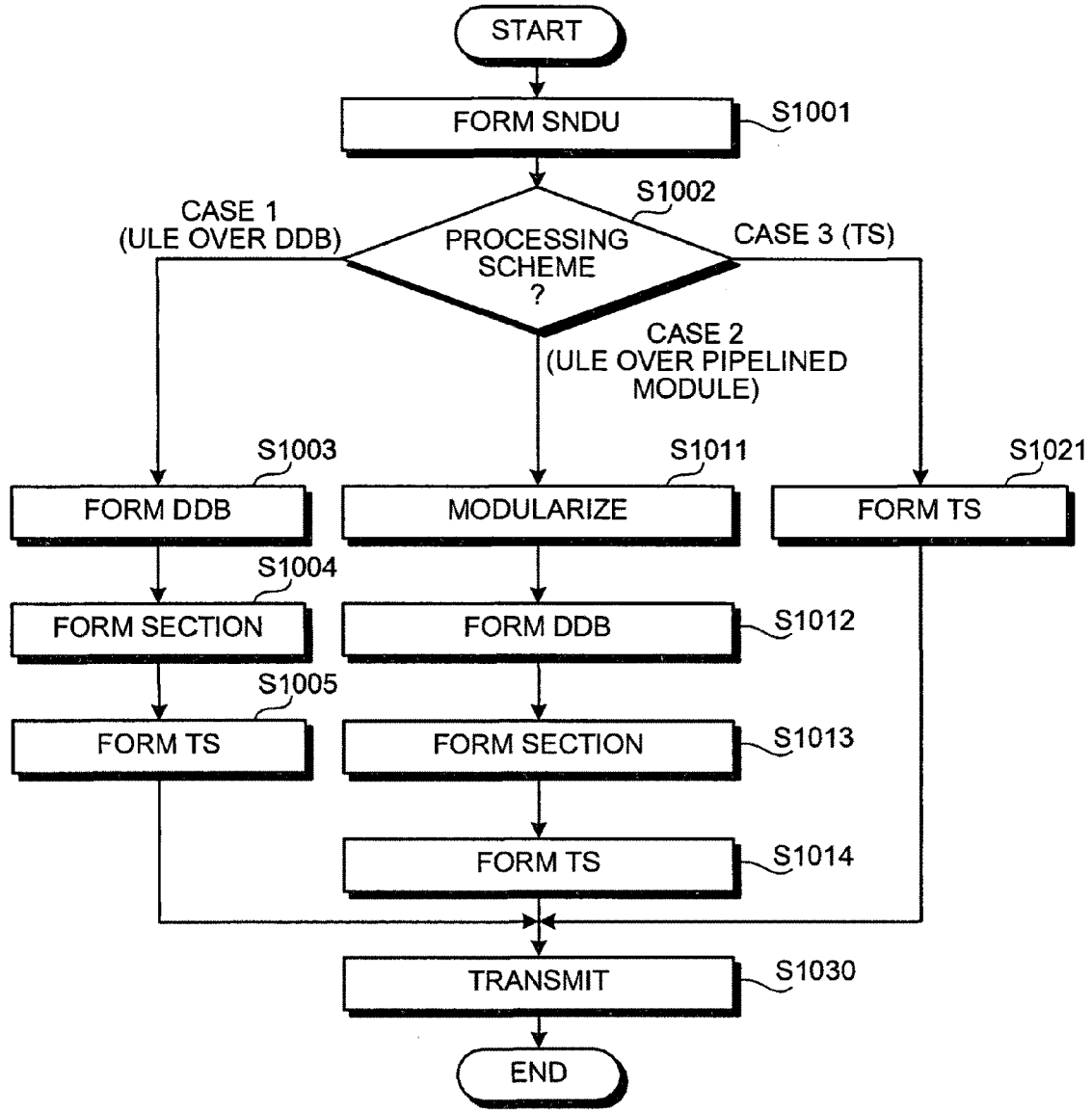

FIG.11

| | ULE over DDB | ULE OVER PIPELINED MODULE |
|---|---|---|
| OVERVIEW | ULE TRAMSMITTED IN DDB OF SUCH SIZE THAT FRAGMENTING (PADDING) OF TSP DOES NOT OCCUR | ULE TRANSMITTED IN Module OF VARIABLE LENGTH MATCHED TO DII OF PREDETERMINED INTERVALS |
| SIZE OF Module | FIXED LENGTH (LENGTH FIT IN 22TSP=4117 BYTES) | VARIABLE LENGTH (4066× 64 BYTES AT MAXIMUM) |
| OUTPUT CYCLE OF DII | BETWEEN DDB OUTPUT INTERVALS (100 ms OR LONGER) | FIXED CYCLE (100 ms) |
| EFFICIENCY WHEN TRAFFIC IS STEADY | GOOD | |
| EFFICIENCY WHEN TRAFFIC IS LOW | | GOOD |
| DELAY | SMALL (100 ms OR LESS?) | LARGE (100 ms OR MORE) |
| FRAGMENTING OF TSP OF DDB= PADDING | NO | YES |
| PROCESSING AT TRANSMITTER END | UPON RECEPTION OF PDU, ENCAPSULATION EXECUTED AND DDB PAYLOAD DIRECTLY GENERATED. UPON PAYLOAD REACHING GIVEN SIZE OR MAXIMUM CYCLE (100 ms) BEING REACHED, DDB HEADER IS APPENDED, AND DIVISION INTO TSP AND TRANSMISSION IS EXECUTED. INDEPENDENT OF THIS PROCESSING, DII TRANSMITTED IN FIXED CYCLE. DESCRIPTION OF Module SIZE CONSTANT; HENCE, UNAFFECTED BY STATE OF DDB. | PDU RECEIVED FOR GIVEN PERIOD AND ACCUMULATED WHILE ENCAPSULATION EXECUTED (FORMATION OF SNDU). DII GENERATED, FROM DATA INDICATING TOTAL SIZE OF ACCUMULATED SNDU GROUP, AND FORMED INTO TSP FOR OUTPUT. THEN, SNDU GROUP DIVIDED INTO DDB. DDB FURTHER DIVIDED INTO TSP AND OUTPUT. |
| PROCESSING AT RECEIVER END | RECEIVED DDB (Module) IS DIVIDED INTO SNDU IN ORDER OF RECEPTION, AND PDU IS EXTRACTED FROM SNDU | (SAME AS LEFT) |
| ADVANTAGE | OVERHEAD IS RELATIVELY SMALL. DELAY IS RELATIVELY SMALL | APPROPRIATE FOR STREAM OF DATA CAROUSEL |
| DIS-ADVANTAGE | CERTAIN AMOUNT OF BAND USED AS DATA CAROUSEL EVEN WHEN PACKET IS NOT TRANSMITTED. DECODING EFFICIENCY AT RECEIVER END IS RELATIVELY LOW WHEN TRAFFIC IS LOW | OVERHEAD IS RELATIVELY LARGE. DELAY IS LARGE |
| APPLICATION EXAMPLE | EFFECTIVE FOR SERVICE IN WHICH CERTAIN AMOUNT OF BAND IS FULLY USED, SUCH AS STREAMING | EFFECTIVE WHEN SIZE OF PACKET IS NOT UNIFORM AND BAND IS NOT FIXED |

BROADCAST-CONTENT TRANSMITTING APPARATUS, BROADCAST-CONTENT RECEIVING APPARATUS, BROADCAST-CONTENT TRANSMITTING METHOD, BROADCAST-CONTENT RECEIVING METHOD, AND PROGRAM

TECHNICAL FIELD

The present invention relates to a broadcast-content transmitting apparatus and a broadcast-content transmitting method that transmit broadcast content for terrestrial digital broadcasts, and a broadcast-content receiving apparatus, a broadcast-content receiving method, and a program that receive broadcast content for the terrestrial digital broadcasts.

BACKGROUND ART

Conventionally, the digitalization of programs broadcasted through a broadcast network, such as that for terrestrial broadcasts, is progressing and the distribution of broadcast content by utilizing high-capacity and high-speed properties of communication networks, such as the Internet, has been gaining momentum.

In digital broadcasts of recent years, data can be transmitter and a receiver. This technology enables data to be transferred through the Internet, and a digital-broadcast receiving apparatus receiving a digital broadcast obtains information concerning a bidirectional web server relevant to the corresponding broadcast content, and communicates with the web server through the Internet, etc. (see, for example, Patent Document 1 below).

Patent Document 1: Japanese Patent Application Laid-open Publication No. 2003-78830

DISCLOSURE OF INVENTION

Problem to be Solved by the Invention

However, a method of transmitting content input as IP packets and the like, using a broadcast wave of a digital broadcast, has not been conventionally disclosed. Therefore, a specific method for transmitting the broadcast content via a digital broadcast network has been required.

To solve the problems associated with the conventional technique described above, it is an object of the present invention to transmit broadcast content whose data is updated in real time, to receivers through a terrestrial digital broadcasting network.

Means for Solving Problem

A broadcast-content transmitting apparatus according to the invention of claim 1 includes an input unit that receives an input of frame data including broadcast content; an encapsulating unit that performs a predetermined encapsulation process on the frame data input to the input unit; a packetizing unit that blocks the frame data encapsulated by the encapsulating unit, into a DDB (Download Data Block) being a predetermined block unit and generates a DII (Download Information Indication) being information concerning the DDB; an encoding unit that outputs, based on a predetermined data carousel scheme, the DDB and the DII output from the packetizing unit as a section; and a transmitting unit that transmits the section output from the encoding unit to a terrestrial digital broadcasting network.

A broadcast-content transmitting apparatus according to the invention of claim 2, based on the invention of claim 1, is characterized by the encapsulating unit, based on a predetermined setting, encapsulating the frame data or an IP packet that is extracted from the frame data.

A broadcast-content transmitting apparatus according to the invention of claim 3, based on the invention of claim 1, characterized by the packetizing unit forming, into an SNDU (SubNetwork Data Unit) of a single frame, the frame data encapsulated by the encapsulating unit and blocking the SNDU into the DDB.

A broadcast-content transmitting apparatus according to the invention of claim 4, based on the invention of claim 1, is characterized by the packetizing unit forming, into an SNDU (SubNetwork Data Unit), the frame data encapsulated by the encapsulating unit, forming the SNDU into a module, and forming the DDB.

A broadcast-content transmitting apparatus according to the invention of claim 5, based on the invention according to any one of claims 1 to 4, is characterized by the frame data being updated in real time, and the encoding unit, according to an update of the frame data, updating a version number of the section and outputting the section.

A broadcast-content receiving apparatus according to the invention of claim 6 includes a receiving unit that receives encapsulated frame data from a terrestrial digital broadcasting network; a decapsulating unit that decapsulates the frame data received; and an extracting unit that divides data in a predetermined block unit obtained from decapsulation by the decapsulating unit, into SNDUs (SubNetwork Data Unit) in order of reception, and extracts the frame data from the SNDUs.

A broadcast-content transmitting method according to the invention of claim 7 includes an input step of receiving an input of frame data including broadcast content; an encapsulating step of performing a predetermined encapsulation process on the frame data input at the input step; a packetizing step of blocking the frame data encapsulated at the encapsulating step, into a DDB (Download Data Block) being a predetermined block unit and generating a DII (Download Information Indication) being information concerning the DDB; an encoding step of outputting, based on a predetermined data carousel scheme, the DDB and the DII output at the packetizing step as a section; and a transmitting step of transmitting the section output at the encoding step to a terrestrial digital broadcasting network.

A broadcast-content receiving method according to the invention of claim 8 includes a receiving step of receiving encapsulated frame data from a terrestrial digital broadcasting network; a decapsulating step of decapsulating the frame data received; and an extracting step of dividing data in a predetermined block unit obtained from decapsulation at the decapsulating step, into SNDUs (SubNetwork Data Unit) in order of reception, and extracting the frame data from the SNDUs.

A computer program according to the invention of claim 9 causes a computer to execute the method according to claim 7 or 8.

Effect of the Invention

According to a broadcast-content transmitting apparatus and a broadcast-content transmitting method of the present invention, broadcast content that is wished to be transmitted can be transmitted to receivers through a terrestrial digital broadcasting network. Particularly, such an effect is achieved that broadcast content whose data is received through a network, such as a LAN, and updated in real time can be transmitted to receivers through a terrestrial digital broadcasting network, by a data carousel scheme.

BRIEF DESCRIPTION OF DRAWINGS

FIG. 1 is a schematic of the broadcast-content transmitting apparatus and the broadcast-content receiving apparatus according to the embodiment of the present invention;

FIG. 2 is a block diagram depicting the functional configuration of the broadcast-content transmitting apparatus according to the embodiment of the present invention;

FIG. 3 is a diagram of an internal configuration of a ULE→SNDU unit;

FIG. 10 is a flowchart of an encapsulation process performed by a ULE encapsulating unit;

FIG. 11 is a comparison chart of encapsulation schemes;

EXPLANATIONS OF LETTERS OR NUMERALS

Figure 4:
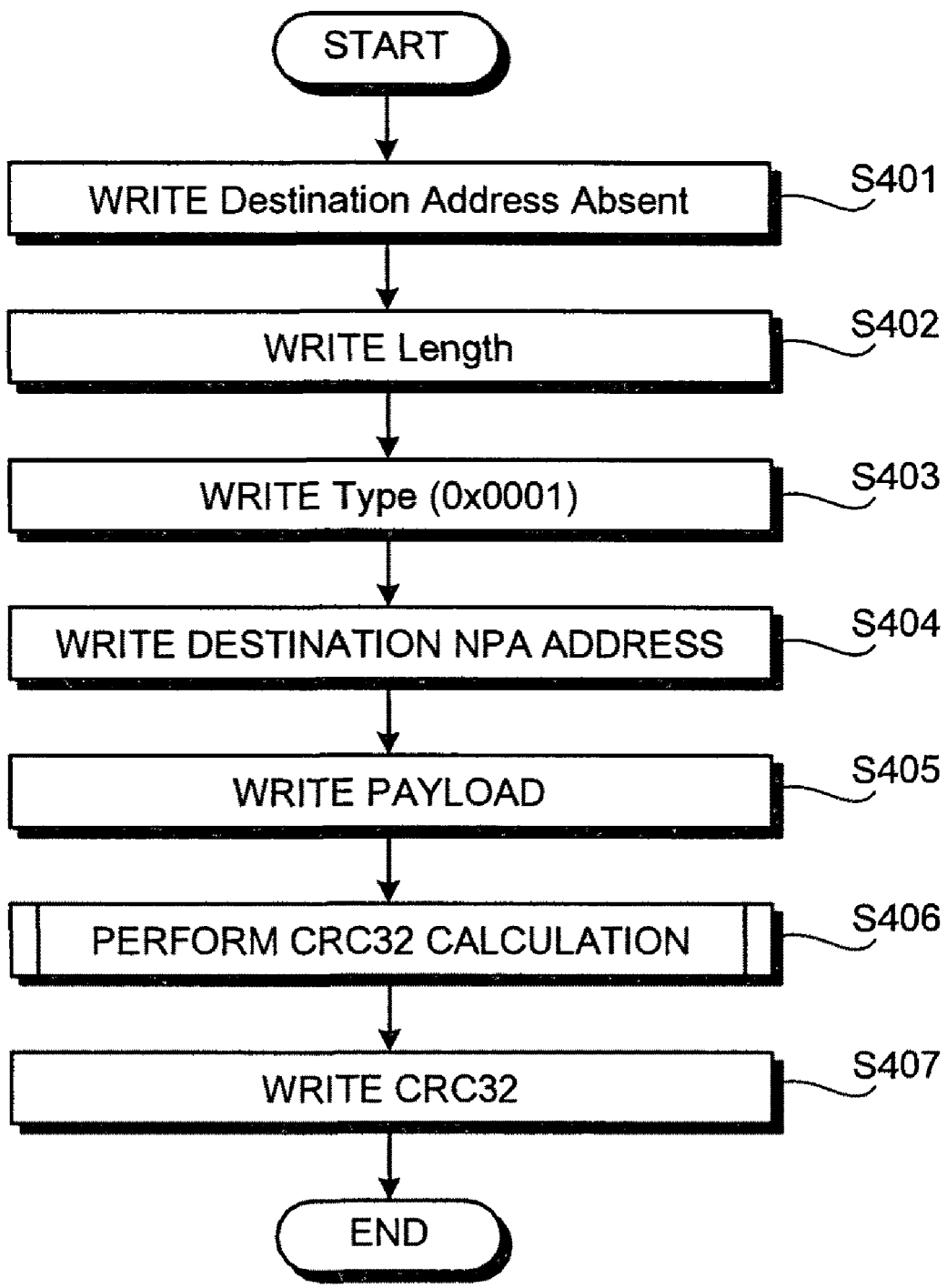
FIG. 4 is a flowchart of an encapsulation process performed by an Etherframe-ULE encapsulating unit.

100 Application server
101 Broadcast-content transmitting apparatus
102 Broadcast-content receiving apparatus
201 Content input unit
202 MPE encapsulating unit
203 ULE encapsulating unit
204 Transmitting unit
205 Encapsulation-information generating unit
211 ULE→SNDU unit
212 SNDU→DDB unit
213 SNDU→MODULE unit
214 SNDU→TS unit
1201 Receiving unit
1202 MPE extracting unit
1203 TS→SNDU unit
1204 DSMCC→SNDU unit
1205 SNDU extracting unit
1210 External output unit

BEST MODE(S) FOR CARRYING OUT THE INVENTION

Exemplary embodiments of a broadcast-content transmitting apparatus, a broadcast-content receiving apparatus, a broadcast-content transmitting method, a broadcast-content receiving method, and a program according to the present invention are explained in detail below with reference to the accompanying drawings.
(Overview of Broadcast-Content Transmitting Apparatus and Broadcast-Content Receiving Apparatus)

First, an overview of the broadcast-content transmitting apparatus and the broadcast-content receiving apparatus according to the embodiment of the present invention is explained.

FIG. 1 is a schematic of the broadcast-content transmitting apparatus and the broadcast-content receiving apparatus according to the embodiment of the present invention. A broadcast-content transmitting apparatus 101 receives an IP packet (for example, an Ethernet frame) that includes broadcast content, from an application server 100 through a network, such as a LAN.

Next, the broadcast-content transmitting apparatus 101 inserts the IP packet into an MPEG2-TS packet to transmit the received Ethernet frame. Presently, transmission of an Ethernet frame inserted in an MPEG2-TS frame in a digital broadcast has not yet been regulated by ARIB (Association of Radio Industries and Businesses). To realize the transmission of an Ethernet frame while complying with ARIB standards, in this embodiment, an Ethernet frame is transmitted using a data carousel that repeatedly transmits data.

In this embodiment, an input Ethernet frame is encapsulated by an MPE (multi-protocol encapsulation) scheme or a ULE (ultra-lightweight encapsulation) scheme into a TS (TS packet) for digital broadcast.

The ULE scheme is primarily explained below. The broadcast-content transmitting apparatus 101 transmits broadcast content by either encapsulation scheme in 1 or 2 below.

1. ULE over DDB (Download Data Block)

An Ethernet frame or an IP packet (IPv6 packet) is encapsulated by ULE, formed into a single frame called an SNDU (Sub-Network Data Unit), and subsequently, into a DDB to be transmitted by carousel transmission. In this scheme, even if input data (Ethernet frame or IP packet) is not input, data formed into a DDB is transmitted.

2. ULE over Pipelined Module

An Ethernet frame or an IP packet (IPv6 packet) is encapsulated by ULE, formed into an SNDU frame, formed into a module, and then formed into a DDB to be transmitted by carousel transmission. In this scheme, a module is generated based on the input of data (Ethernet frame or IP packet), and then formed into a DDB to be transmitted. Therefore, without input data, no module is generated nor is data formed into a DDB.

On the other hand, a broadcast-content receiving apparatus 102 receives an encapsulated Ethernet frame that is transmitted from the broadcast-content transmitting apparatus 101. The broadcast-content receiving apparatus 102 then decapsulates the Ethernet frame received. Decapsulation is performed with reference to information concerning an encapsulation scheme and is transmitted along with the encapsulated Ethernet frame. The broadcast-content receiving apparatus 102 plays broadcast content based on the decapsulated Ethernet frame.

(Functional Configuration of Broadcast-Content Transmitting Apparatus)

Next, a functional configuration of the broadcast-content transmitting apparatus according to the embodiment of the present invention is explained.

FIG. 2 is a block diagram depicting the functional configuration of the broadcast-content transmitting apparatus according to the embodiment of the present invention. A broadcast-content transmitting apparatus 101 is provided at a broadcast station. A content input unit 201 is input with an Ethernet frame (IP packet) that includes broadcast content and is transmitted from the application server 100 (see FIG. 1) through a network, such as a LAN. The Ethernet frame that is input to the content input unit 201 is encapsulated by an encapsulating unit downstream.

An MPE encapsulating unit 202 encapsulates the Ethernet frame by the MPE scheme. A ULE encapsulating unit 203 encapsulates the Ethernet frame by adding a ULE header.

Encapsulation by either the MPE encapsulating unit 202 or the ULE encapsulating unit 203 is performed depending on a setting.

An encapsulation-information generating unit 205 generates information concerning the encapsulation scheme that has been used for the encapsulation performed by the MPE encapsulating unit 202 or the ULE encapsulating unit 203. The information concerning the encapsulation scheme is described in PSI/SI (PMT) information. The information concerning the encapsulation scheme generated at this stage is transmitted to the broadcast-content receiving apparatus 102 (see FIG. 1), and is referred to when the Ethernet frame is decapsulated by the broadcast-content receiving apparatus 102.

A transmitting unit 204 transmits the Ethernet frame that is encapsulated by the MPE encapsulating unit 202 or the ULE encapsulating unit 203, and the information concerning the encapsulation scheme that is generated by the encapsulation-information generating unit 205 to a terrestrial digital broadcasting network (see FIG. 1).

Next, an internal configuration of the ULE encapsulating unit 203 is explained. The ULE encapsulating unit 203 includes a ULE→SNDU unit 211, an SNDU→DDB unit 212, an SNDU→MODULE unit 213, and an SNDU→TS unit 214.

The ULE→SNDU unit 211 encapsulates an Ethernet frame by the ULE scheme. The SNDU→DDB unit 212 converts the Ethernet frame that has been encapsulated by one scheme (ULE over DDB) into a data carousel to output in a section (Sec). The SNDU→MODULE unit 213 converts the Ethernet frame that has been encapsulated by another scheme (ULE over Pipelined Module) into a data carousel to output in a section (Sec). The SNDU→TS unit 214 outputs the Ethernet frame in a TS without conversion into a data carousel. The unit to be used among the ULE→SNDU unit 211, the SNDU→DDB unit 212, the SNDU→MODULE unit 213, and the SNDU→TS unit 214 can be arbitrarily set with consideration of respective characteristics, and explanation thereof is provided hereinafter.

FIG. 3 is a diagram of an internal configuration of the ULE→SNDU unit. The ULE→SNDU unit 211 includes a destination-NPA-address generating unit 301, a switching unit (SW) 302, an IP extracting unit 303, an IP-ULE encapsulating unit 304, an Etherframe-ULE encapsulating unit 305.

In the destination-NPA-address generating unit 301, a total of three types of settings are possible: 1. a setting that assigns an NPA address to all input Ethernet frames; 2. a setting that does not assign an NPA address to any input frame; and 3. a setting that determines whether to assign an NPA address depending on a destination address of an input Ethernet frame. In the case of determining assignment based on an address of an Ethernet frame, the setting may be such that an NPA address is assigned if a unicast address has been assigned, and no NPA address is assigned if a broadcast address or a multicast address has been assigned to the Ethernet frame.

The switching unit (SW) 302 switches the output destination of an Ethernet frame between the IP extracting unit 303 and the Etherframe-ULE encapsulating unit 305, the setting of which may be arbitrarily set depending on respective characteristics the IP extracting unit 303 and the Etherframe-ULE encapsulating unit 305.

When the switching unit 302 switches to the IP extracting unit 303, the IP extracting unit 303 extracts an IP packet (IPv6 IP packet) from the Ethernet frame. The IP packet is then encapsulated by the IP-ULE encapsulating unit 304. On the other hand, when the switching unit 302 switches to the Etherframe-ULE encapsulating unit 305, the Etherframe-ULE encapsulating unit 305 encapsulates the Ethernet frame directly. When an NPA address is output from the destination-NPA-address generating unit 301, both the IP-ULE encapsulating unit 304 and the Etherframe-ULE encapsulating unit 305 assign this NPA address. In addition, the number of times encapsulation is performed is output as statistical information.

FIG. 4 is a flowchart of an encapsulation process performed by the Etherframe-ULE encapsulating unit. First, Destination Address Absent (1 bit) is written (step S401). Length (15 bits) indicating the length of an SNDU is then written (step S402). Subsequently, Type (16 bits, 0x0001 fixed) is written (step S403), and a destination NPA address (48 bits) is written (step S404). The input Ethernet frame is then written to a payload (8xn bits) (step S405), CRC32 (32 bits) is calculated, i.e., error correction processing (step S406), and this CRC32 is written (step S407). Thus, the encapsulation process is ended.

At the time of encapsulation of the Ethernet frame and output of the SNDU, a counter for the statistical information is incremented. The encapsulation process described in FIG. 4 is a process performed when there is a destination NPA address, and the process of step S404 is performed correspondingly thereto. When there is no destination NPA address, the process of step S404 is not performed.

Figure 5:
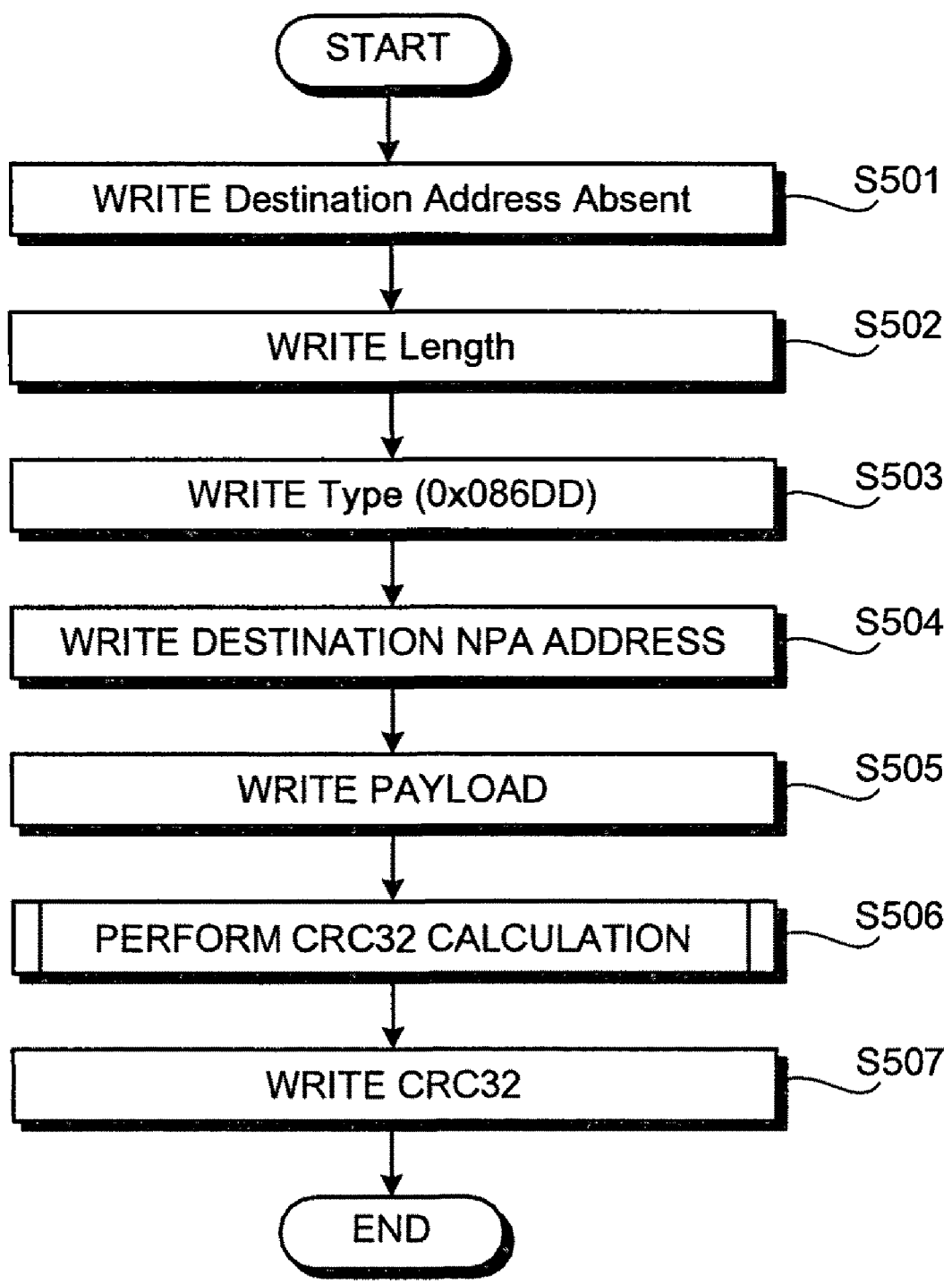
FIG. 5 is a flowchart showing an encapsulation process performed by an IP-ULE encapsulating unit.

FIG. 5 is a flowchart showing an encapsulation process performed by the IP-ULE encapsulating unit. First, Destination Address Absent (1 bit) is written (step S501). Length (15 bits) indicating the length of an SNDU is then written (step S502). Subsequently, Type (16 bits, in the case of IPv6: 0x86DD fixed) is written (step S503), and a destination NPA address (48 bits) is written (step S504). The input IP packet is then written to a payload (8xn bits) (step S505), CRC32 (32 bits) is calculated, i.e., an error correction process (step S506), and this CRC32 is written (step S507). Thus, the encapsulation process is ended.

At the time of encapsulation of the IPv6 packet and output of the SNDU, the counter for the statistical information is incremented. The encapsulation process described in FIG. 5 is a process performed when there is a destination NPA address, and the process of step S504 is performed correspondingly thereto. When there is no destination NPA address, the process of step S504 is not performed.

(Configuration of ULE Over DDB)

Figure 6:
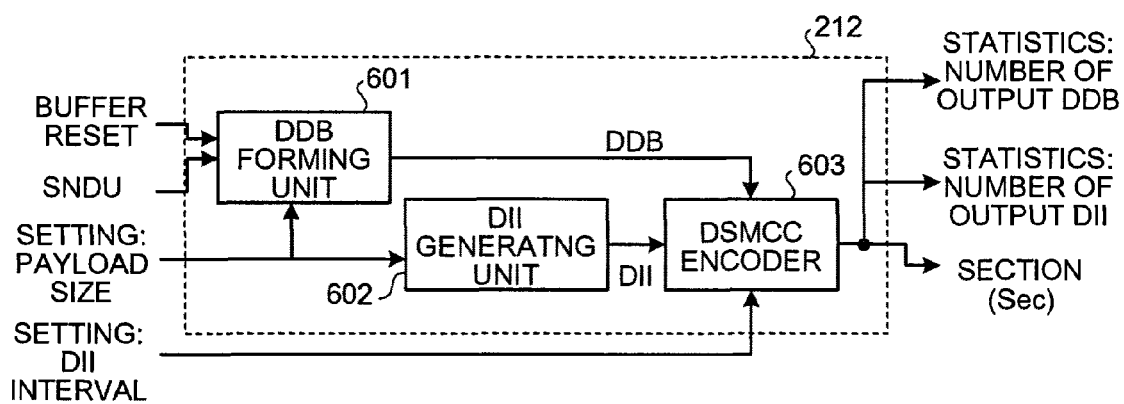
FIG. 6 is a block diagram of an internal configuration of an SNDU→DDB unit.

FIG. 6 is a block diagram of an internal configuration of the SNDU→DDB unit. The SNDU→DDB unit 212 packetizes an SNDU into a DDB by the ULE over DDB scheme described above. The SNDU→DDB unit 212 is constituted by a DDB forming unit 601, a DII (download info indication) generating unit 602, and a DSMCC encoder 603.

The DDB forming unit 601 constructs a DDB from an SNDU that is input from the ULE→SNDU unit 211. With respect to a single DDB output, plural SNDUs can be input. Moreover, when an SNDU is packetized, a single SNDU can be separated into a first part and a latter part and can be placed over plural DDBs. In this case, the latter part of the SNDU is buffered until the next DDB construction. The buffer is cleared by an input of a buffer reset. The size of payload of a DDB is input from the outside.

In the payload, Pointer Field (16 bits) is arranged at the head, and Pointer Field points to a head of an SNDU. In this payload, plural SNDUs (8xn bits) are arranged. Each DDB has a variable. module_id is an identifier for each module (each DDB), and is an integer that is incremented as 0, 1, 2, 3. module_version is a version number of each module (each DDB), and is incremented from 0 to 255. 0 is used after 255. block_number and last_section number are both 0 in the ULE over DDB scheme.

The DII generating unit 602 generates DII that is meta data providing information concerning a DDB formed by the DDB forming unit 601, to a receiver. A DII is generated according to each DDB. A DII has a variable indicating the information concerning a DDB. module_id is an identifier for each module (each DDB), and when four modules are used, 0, 1, 2, 3 are used, i.e., successive increments. module_size is variable depending on the setting, and the maximum value is, for example, 4017. module_version is a version number for each module (each DDB) and is incremented from 0.

The DSMCC encoder 603 outputs a DDB that is constructed by the DDB forming unit 601 and a DII that is generated by the DII generating unit 602, in a section (Sec) format, as a carousel. This section is output based on the interval setting input for the DII. This DSMCC encoder 603 respectively outputs the number of output sections of the DII and the number of output DDB sections as statistical information.

Figure 7:
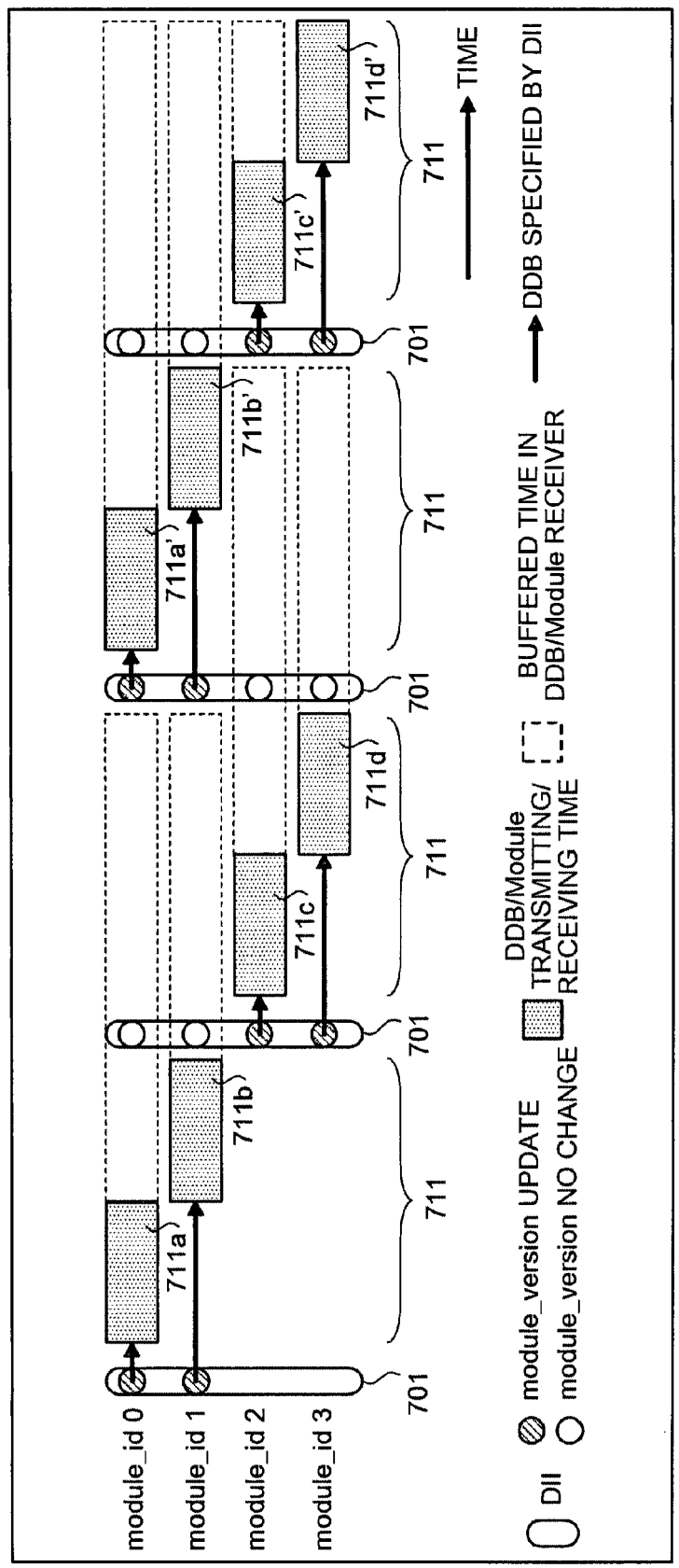
FIG. 7 is a temporal sequence diagram for content transmitted by a DSMCC encoder.

FIG. 7 is a temporal sequence diagram for content transmitted by the DSMCC encoder. The horizontal axis in the diagram indicates time. As shown, transmission of a DII 701 followed by transmission of a DDB 711 is repeated. When transmitted, the DII 701 is combined with module_id and module version, and called. For one DII701, module_id and module_version are called 2 times. Moreover, immediately after module_id and module_version are changed, the DDB 711 corresponding thereto is transmitted.

In the example shown in this diagram, the DII 701 of a section first called (transmitted) by the DSMCC encoder 603 has [m0, v0] [m1, v0], and [m0, v0, b0] is transmitted as a DDB 711*a* corresponding thereto. Subsequently, a DDB 711*b* [m1, v0, b0] is transmitted as a section that is called second by the DSMCC encoder 603, where m indicates module_id, v indicates module_version, and b indicates block_number.

The DII 701 of a section called third by the DSMCC encoder 603 is [m0, v0] [m1, v0] [m2, v0] [m3, v0], and [m2, v0, b0] is transmitted as a DDB 711*c* corresponding thereto. Subsequently, [m3, v0, b0] is transmitted as a DDB 711*d* of a section that is called fourth by the DSMCC encoder 603.

The transmitting and receiving period of the module configuring the DDB 711 (711*a* to 711*d*) is the interval surrounded by a solid line in the diagram, and the interval indicated by a dotted line in the diagram is time (interval between reception) during which these DDBs 711 are buffered in a receiver.

Subsequently, DDBs 711*a'* to 711*d'* in which module_version is updated are transmitted. For example, the DII 701 of a section that is called fifth has [m0, v1] [m1, v1] [m2, v0] [m3, v0], and [m0, v1, b0] is transmitted as the DDB 711*a'* in which the version number is updated corresponding thereto, followed by [m1, v1, b0] as a DDB 711*b'*. Thereafter, transmission of the DII 701 followed by transmission of the DDB 711 indicated by this DII 701 is repeated similarly. This DDI 701 and DDB 711 transmission Scheme utilizes the data carousel. As described, by using a data carousel, new data can be transmitted one after another while updating the version number.

(Configuration of ULE Over Pipelined Module)

Figure 8:
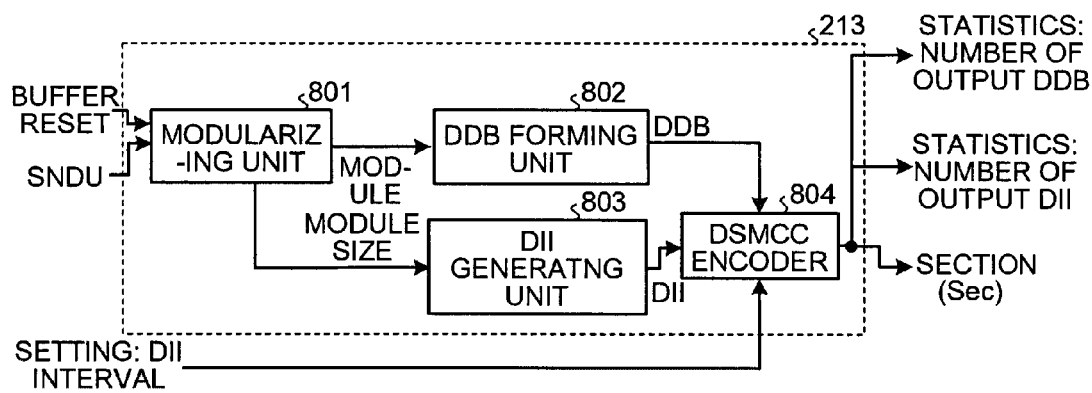
FIG. 8 is a block diagram showing an internal configuration of an SNDU→MODULE unit.

FIG. 8 is a block diagram showing an internal configuration of the SNDU→MODULE unit. The SNDU→MODULE unit 213 packetizes an SNDU into a DDB by the ULE over Pipelined Module scheme described above. The SNDU→MODULE unit 213 includes a modularizing unit 801, a DDB forming unit 802, a DII generating unit 803, and a DSMCC encoder 804.

The modularizing unit 801 is input with an SNDU from the ULE→SNDU unit 211. This modularizing unit 801 modularizes the SNDU that is input during a certain period of time and outputs a resultant module. If no SNDU is input during this period, and if no SNDU that is carried over from the previous period is present, no module is generated or output.

The DDB forming unit 802 forms a DDB from the module that is output from the modularizing unit 801. Specifically, by dividing the module by the maximum length of 4066 bytes (a module resulting from this division is referred to as a block), DDB construction is performed. The DDB is a block and as there are plural blocks, block_number is variable. The buffer is cleared by the input of a buffer reset.

Each DDB has a variable. module_id is an identifier for each module (each DDB), and is an integer that is incremented as 0, 1, 2, 3. module_version is a version number of each module (each DDB), and is incremented from 0 to 255. 0 is used after 255. block_number and last_section number take a value equal to or greater than 0 corresponding to the number of blocks.

The DII generating unit 803 generates a DII to provide information concerning a module formed by the modularizing unit 801 and information concerning a DDB formed by the DDB forming unit 802, to a receiver. One DII is generated for each DDB. A DII has a variable indicating the information concerning the DDB. module_id is an identifier for each module (each DDB), and when four modules are used, 0, 1, 2, 3 are used, i.e., successive increments. module_size indicates the size modularized by the modularizing unit 801. module_version is a version number of each module (each DDB) and is incremented from 0.

The DSMCC encoder 804 outputs the DDB that is formed by the DDB forming unit 802 and the DII that is generated by the DII generating unit 803 as a section (Sec) to be a carousel. This section is output based on the interval setting input for the DII. This DSMCC encoder 804 outputs the number of output DII sections and the number of output DDB sections as statistical information.

Figure 9:
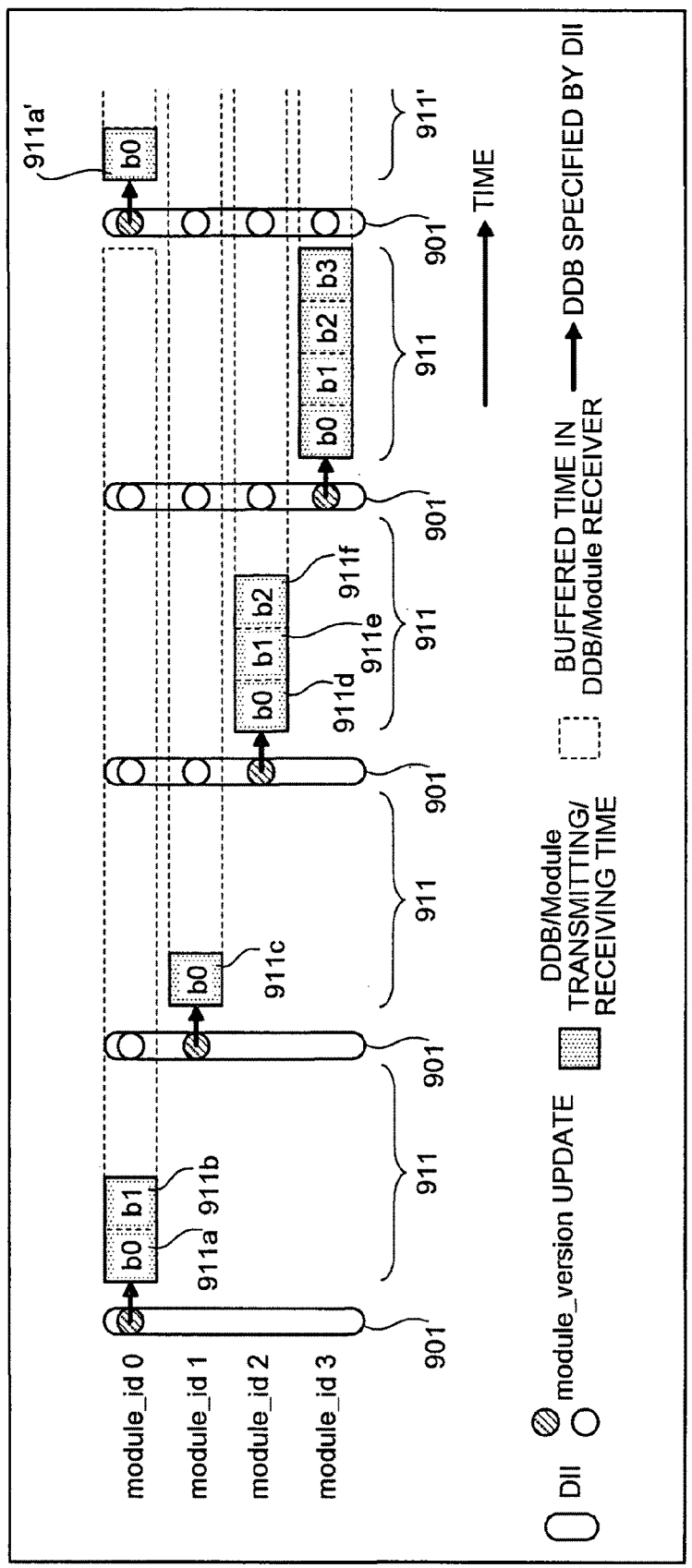
FIG. 9 is a temporal sequence diagram for content transmitted by the DSMCC encoder.

FIG. 9 is a temporal sequence diagram for content transmitted by the DSMCC encoder. The horizontal axis in the diagram indicates time. As shown, transmission of one DII 901 followed by transmission of one DDB 911 is repeated at regular intervals. Description of the DII 901 is executed such that module_id and module_version of the module to be transmitted are always new description.

In the example shown in this diagram, the DII 901 of a section first called (transmitted) by the DSMCC encoder 804 is [m0, v0], and two separated blocks, a DDB 911*a* [m0, v0, b0] and a DDB 911*b* [m0, v0, b1], are transmitted as a DDB 911 corresponding thereto. Since the block is divided into two, blocks b0 and b1 constitute block b, where m indicates module_id, v indicates module_version, and b indicates block_number.

The DII 901 of a section called second is [m0, v0] [m1, v0], and a DDB 911*c* [m1, v0, b0] is transmitted corresponding thereto. The DII 901 of a section called third is [m0, v0] [m1, v0] [m2, v0], and a DDB 911*d* [m2, v0, b0] and a DDB 911*e* [m2, v0, b1], and a DDB 911*f* [m2, v0, b2] (three divided blocks) are transmitted correspondingly thereto.

The transmitting and receiving period of the DDB 911 (911*a* to 911*f*) is the interval surrounded by a solid line in the diagram, and the interval indicated by a dotted line in the diagram is time (interval between reception) during which these DDB 911 are buffered in a receiver.

At the time of transmission of the DII 901 that is called fifth, a DDB 911' in which module_version is updated is transmitted. For example, the DII 901 of a section that is called fifth is [m0, v1] [m1, v0] [m2, v0] [m3, v0], and [m0, v1, b0] is transmitted as the DDB 911a' in which the version number is updated corresponding thereto. Thereafter, transmission of the DII 901 followed by transmission of the DDB 911 indicated by this DII 901 is repeated similarly. This DDI 901 and DDB 911 transmission scheme Utilizes the data carousel. As described, by using a data carousel, new data can be transmitted one after another while updating the version number.

(Configuration of SNDU→TS Unit)

Unlike the SNDU→DDB unit 212 or the SNDU→MODULE unit 213, the SNDU→TS unit 214 outputs a TS without using a data carousel. The SNDU→TS unit 214 divides a single input SNDU into several TS packets for output. When the SNDU is packetized among plural TS packets, the part of the SNDU to be inserted in a subsequent TS packet is temporarily buffered. The buffer is cleared by the input of a buffer reset.

A section that is output from the SNDU→DDB unit 212 or the SNDU→MODULE unit 213 described above, and a TS that is output from the SNDU→TS unit 214 is output to the transmitting unit 204. When a TS is input, the transmitting unit 204 outputs the TS. When a section is input, the transmitting unit 204 divides the section into TS packets for output. The number of the TS packets is output as the statistical information.

The encapsulation-information generating unit 205 generates information concerning the encapsulation scheme based on the information output from the MPE encapsulating unit 202 or each component constituting the ULE encapsulating unit 203 (the ULE→SNDU unit 211, the SNDU→DDB unit 212, the SNDU→TS unit 214), and outputs the information to the transmitting unit 204.

FIG. 10 is a flowchart of an encapsulation process performed by the ULE encapsulating unit. An input Ethernet frame is encapsulated by either the MPE encapsulating unit 202 or the ULE encapsulating unit 203. In FIG. 10, encapsulation by the ULE encapsulating unit 203 is described.

First, the Ethernet frame is formed into an SNDU by the ULE→SNDU unit 211 (step S1001). Here, the flowchart diverges according to different schemes. In the case of ULE over DDB (Case 1), the SNDU is output to the SNDU→DDB unit 212. The SNDU is formed into a DDB (step S1003), and then a section (step S1004), and is formed into a TS by the transmitting unit 204 (step S1005) for transmission (step S1030).

In the case of ULE over Pipelined Module (Case 2), the SNDU is output to the SNDU→MODULE unit 213. The SNDU is modularized (step S1011), and formed into a DDB (step S1012), and then into a section (step S1013), and is formed into a TS by the transmitting unit 204 (step S1014) for transmission (step S1030).

Moreover, when no section is formed (Case 3), the SNDU is formed into a TS (step S1021), and then transmitted by the transmitting unit 204 (step S1030).

FIG. 11 is a comparison chart of the encapsulation schemes. Differences between ULE over DDB and ULE over Pipelined Module are shown. In ULE over DDB, a ULE is transmitted in a DDB of such a size that fragmenting (padding) of a TSP (TS packet) does not occur, and the size of a Module is fixed length. An advantage is that the overhead is relatively small. A disadvantage is that a certain amount of band is used as a data carousel even if a packet is not being transmitted. Therefore, as an application example, this scheme is effective for a service in which a certain amount of band is fully used, such as streaming.

On the other hand, in ULE over Pipelined Module, a ULE is transmitted in a Module of variable length (size) that is matched to the transmission of DII in regular intervals. An advantage is that it is appropriate (suitable) for a stream of the data carousel. A disadvantage is that delay is large since the overhead is relatively large. Therefore, as an application example, this scheme is effective for a case in which packet size is not uniform and the band is not fixed.

With the broadcast-content transmitting apparatus according to the present embodiment, it becomes possible to transmit an input Ethernet frame by encapsulation and forming a TS for digital broadcast by the process described above. Particularly, by using a data carousel, it becomes possible to transmit new information (broadcast content) updated in real time.

(Functional Configuration of Broadcast-Content Receiving Apparatus)

Next a functional configuration of the broadcast-content receiving apparatus is explained.

Figure 12:
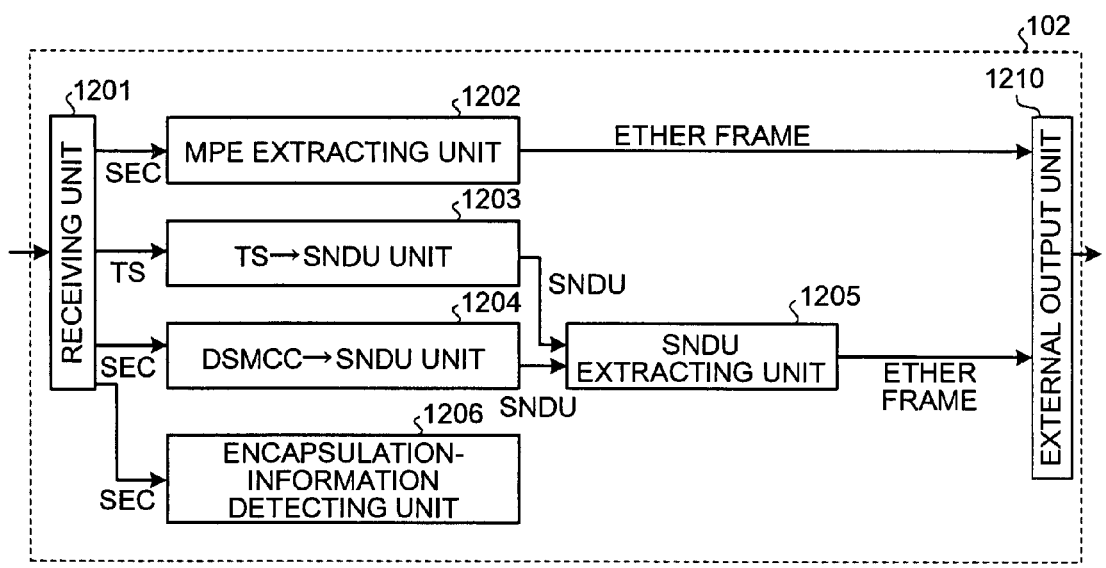
FIG. 12 is a block diagram of a functional configuration of a broadcast-content receiving apparatus according to an embodiment of the present invention.

FIG. 12 is a block diagram of the functional configuration of the broadcast-content receiving apparatus according to an embodiment of the present invention. The broadcast-content receiving apparatus 102 includes a receiving unit 1201, an MPE extracting unit 1202, a TS→SNDU unit 1203, a DSMCC→SNDU unit 1204, an SNDU extracting unit 1205, and encapsulation-information detecting unit 1206, and an external output unit 1210.

The receiving unit 1201 receives a TS that is transmitted from the broadcast-content transmitting apparatus 101 (see FIG. 1) through a digital broadcasting wave. The TS includes an encapsulated Ethernet frame (IP packet) and information concerning the encapsulation scheme used for the Ethernet frame. This receiving unit 1201 decodes the received TS by PID included in received PSI/SI (PMT) data and the method specified in a construction method (TS or section). When the output setting of the capsule information analyzed by the encapsulation-information detecting unit 1206 is for TS, all TS (TS packets) that match the PID are output as they are and when set for section output, section construction is performed with respect to TS that match the PID and the section is output.

An encapsulation-information detecting unit 1206 detects information concerning the encapsulation scheme that is described in the PSI/SI (PMT) data, and selectively causes the functional unit corresponding to the detected encapsulation scheme, i.e., the MPE extracting unit 1202, the TS→SNDU unit 1203, or the DSMCC→SNDU unit 1204, to operate.

The MPE extracting unit 1202 is selectively activated when the encapsulation-information detecting unit 1206 detects the MPE scheme. It is a counterpart component of the MPE encapsulating unit 202 (see FIG. 2) of the broadcast-content transmitting apparatus 101. This MPE extracting unit 1202 generates an Ethernet frame from an input section for output to the external output unit 1210. At this time, only a section having a destination NPA address that matches an NPA address of a receiver, or that is a broadcast address or a multicast address is received, and all other sections are discarded. When an NPA address is not assigned, it is determined whether address information (MAC address of the Ethernet frame, or the like) in the SNDU matches network interface information of the external output unit 1210, and only that which matches, or has a broadcast address or a multicast address is received.

The TS→SNDU unit 1203 is selectively activated when the encapsulation-information detecting unit 1206 detects the ULE scheme of forming TS, and extracts an SNDU from the input TS. It is a counterpart component of the SNDU→TS unit 214 of the broadcast-content transmitting apparatus 101. Usually, an SNDU is constituted of several TS, and therefore, a buffer that enables generation of one SNDU is provided.

The DSMCC→SNDU unit 1204 is selectively activated when the encapsulation-information detecting unit 1206 detects the ULE over DDB scheme or the ULE over Pipelined Module scheme, and extracts an SNDU from the input section. It is a counterpart component of the SNDU→DDB unit 212 and the SNDU→MODULE unit 213 of the broadcast-content transmitting apparatus 101. An SNDU can be arranged among plural modules, and therefore, a buffer that stores the partially received SNDU is provided. The buffer is cleared by the input of a buffer reset.

The SNDU extracting unit 1205 receives only that which has a destination NPA address that matches an NPA address of a receiver, or is a broadcast address or a multicast address, and discards all others. When an NPA address is not assigned, it is determined whether address information (MAC address of the Ethernet frame, or the like) in the SNDU matches network interface information of the external output unit 1210, and only that which matches, or has a broadcast address or a multicast address is received. Furthermore, the CRC32, which is for error correction, is performed, and that which does not pass the check is also discarded. Thereafter, an IP (IPv6) packet or an Ethernet frame is extracted from the SNDU and output.

The external output unit 1210 temporarily stores the input Ethernet frame in a FIFO buffer and outputs the Ethernet frame. When the output from the SNDU is an IP (IPv6), a MAC address or the like is assigned and an Ethernet frame is constructed and output.

Figure 13:
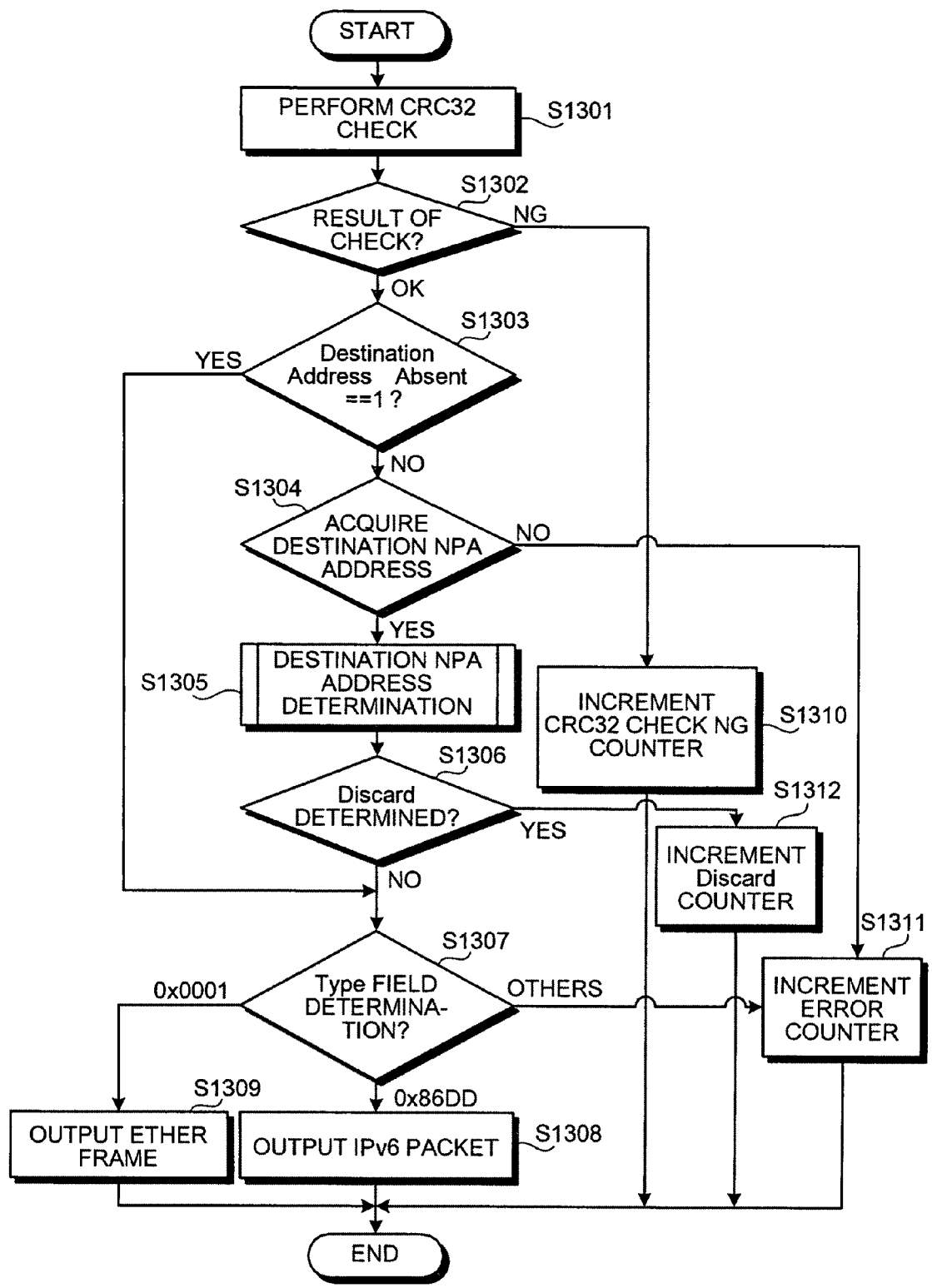
FIG. 13 is a flowchart of a process performed by an SNDU extracting unit.

FIG. 13 is a flowchart of a process performed by the SNDU extracting unit. First, the CRC32 check, which is for error correction, is performed on an input SNDU (step S1301). When the result of the CRC32 check is OK (step S1302: OK), it is determined whether the SNDU is to be discarded based on the destination NPA address by determining whether Destination Address Absent=0 (step S1303). When the result of the CRC32 check is NG (step S1302: NG), a CRC32 check NG counter is incremented (step S1310), and the process is ended.

When Destination Address Absent=1 (step S1303: Yes), there is no destination NPA address in the SNDU; therefore, the determination whether to discard based on the destination NPA address is not performed (not discarded), and the process proceeds to step S1307. When Destination Address Absent takes a value other than 1 (step S1303: No), it is the case in which a destination NPA address is assigned, and the destination NPA address is acquired (step S1304). When the destination NPA address cannot be acquired (step S1304: No), the error counter is incremented (step S1311), and the process is ended.

When the destination NPA address is acquired at step S1304 (step S1304: Yes), subsequently, determination of the destination NPA address is performed (step S1305), and the discard determination is performed (step S1306). When the SNDU is not subject to discard and the destination NPA address indicates the broadcast-content receiving apparatus 102 (step S1306: No), it is not discarded and Type field determination is performed next (step S1307). When the destination NPA address does not indicate the broadcast-content receiving apparatus 102 (step S1306: Yes), the SNDU is discarded, and a Discard counter is incremented (step S1312). Thus, the process is ended.

In the Type field determination at step S1307, when a value of the Type field is 0x86DD (step S1307: 0x86DD), an IP (v6) packet is output (step S1308). On the other hand, when the value of the Type field is 0x001(step S1307: 0x0001), an Ether frame is output (step S1309). Moreover, when the value of the Type filed is another value (other than 0x86DD and 0x001) (step S1307: others), the error counter is incremented (step S1311), and the process is ended. When the IPv6 packet is output, the SNDU extracting unit 1205 assigns a destination MAC address, a source MAC address, and Ether Type to the IPv6 packet, and outputs it as an Ether frame.

With the broadcast-content receiving apparatus according to the present embodiment, it becomes possible to decapsulate a received Ethernet frame that is encapsulated into a TS for digital broadcast, and to determine whether to take in the TS based on the destination. Particularly, by using a data carousel, it becomes possible to transmit new information (broadcast content) updated in real time.

The broadcast-content transmitting and receiving method explained in the present embodiment can be implemented by a computer, such as a personal computer and a workstation, executing a program that is prepared in advance. This program is recorded on a computer-readable recording medium such as a hard disk, a flexible disk, a CD-ROM, an MO, and a DVD, and is executed by being read out from the recording medium by a computer. This program can be a transmission medium that can be distributed through a network such as the Internet.

INDUSTRIAL APPLICABILITY

As described, the present invention is useful for terrestrial digital broadcasting, and is suitable for a transmitting apparatus and a receiving apparatus that can transmit content data to a receiver end through a digital broadcasting network, particularly one that constantly transmits updated data using a data carousel scheme.

The invention claimed is:
1. A broadcast-content transmitting apparatus comprising:
an input unit that receives an input of frame data that is input in real time, the frame data including broadcast content;
an encapsulating unit that performs a predetermined encapsulation process on the frame data input to the input unit and forms a sub-network data unit;
a packetizing unit that blocks the frame data encapsulated to be the sub-network data unit by the encapsulating unit, into a DDB (Download Data Block) being a predetermined block unit and generates a DII (Download Information Indication) being information concerning the DDB, the DDB including a module id that is an identifier for the DDB and a module version that is a version number of the DDB, the DII includes the module id and the module version for the DDB to which the DII corresponds, and the packetizing unit updates the module ids and the module versions of the DDB and the DII as the frame data is input;
an encoding unit that outputs the DII followed by the DDB in given periodic intervals, where two DIIs having an identical combination of the module id and the module version are always transmitted in a row, and outputs a DDB that is present immediately after the module id and the module version of the DII change, the DDB and the DII output from the packetizing unit being output as a section based on a predetermined data carousel scheme; and a transmitting unit that transmits the section output from the encoding unit to a terrestrial digital broadcasting network.

2. The broadcast-content transmitting apparatus according to claim 1, further comprising:

a second packetizing unit that blocks the frame data encapsulated to be the sub-network data unit by the encapsulating unit, into a DDB being a predetermined block unit, generates a DII being information concerning the DDB, modularizes, as the frame data is input, the sub-network data unit that is generated during a certain period of time, forms DDBs by dividing a module by maximum length of 4066 bytes into multiple blocks having variable length, each DDB having the module id, the module version, and the block number, and generates a DII having the module id and the module version of a corresponding DDB, a second encoding unit outputs the DII followed by the DDB in given periodic intervals, the DDB and the DII output from the second packetizing unit being output as a section based on a predetermined data carousel scheme, so that the module id and the module version of the DII to be transmitted are always new, wherein a second way of forming a DDB is made up of the second packetizing unit and the second encoding unit.

3. The broadcast-content transmitting apparatus according to claim 2, wherein the encapsulating unit, based on a predetermined setting, encapsulates the frame data or an IP packet that is extracted from the frame data.

4. The broadcast-content transmitting apparatus according to claim 1, wherein the encapsulating unit, based on a predetermined setting, encapsulates the frame data or an IP packet that is extracted from the frame data.

5. A broadcast-content transmitting system comprising:
a transmitting apparatus that transmits broadcast content; and
a receiving apparatus that receives the broadcast content, wherein the transmitting apparatus includes:
an input unit that receives an input of frame data that is input in real time, the frame data including the broadcast content;
an encapsulating unit that performs a predetermined encapsulation process on the frame data input to the input unit and forms a sub-network data unit;
a packetizing unit that blocks the frame data encapsulated to be the sub-network data unit by the encapsulating unit, into a DDB (Download Data Block) being a predetermined block unit and generates a DII (Download Information Indication) being information concerning the DDB, the DDB including a module id that is an identifier for the DDB and a module version that is a version number for the DDB, the DII having the module id and the module version for a corresponding DDB, and the packetizing unit updates the module ids and module versions of the DDB and the DII as the frame data is input;
an encoding unit that outputs the DDB and the DII output from the packetizing unit as a section based on a predetermined data carousel scheme, wherein the DII is output followed by the DBB output in given periodic intervals, where two DIIs having an identical combination of module id and module version are always transmitted in a row, and outputs the DDB that is present immediately after the module id and the module version of the DII change; and a transmitting unit that transmits the section output from the encoding unit to a terrestrial digital broadcasting network, and wherein the receiving apparatus includes:
a receiving unit that receives the capsulated frame data from the terrestrial digital broadcasting network;
a decapsulating unit that decapsulates the frame data received; and
an extracting unit that divides data into sub-network data units in order of reception, the data being obtained by the decapsulating unit.

6. A broadcast content transmitting method comprising:
receiving frame data that is input in real time, the frame data including broadcast content;
performing a predetermined encapsulation process on the frame data and forms a sub-network data unit;
blocking the frame data encapsulated to be the sub-network data unit into a DDB (Download Data Block) being a predetermined block unit, the DDB including a module id that is an identifier for the DDB and a module version that is a version number of the DDB;
generating a DII (Download Information Indication) being information concerning the DDB, the DII including the module id and the module version for a corresponding DDB;
updating the module ids and the module versions of the DDB and the DII;
outputting the DDB and the DII as a section based on a predetermined data carousel scheme, the DII output being followed by the DDB output in a given interval, which is repeated, and two DIIs having an identical combination of the module id and the module version are always transmitted in a row, and outputting the DDB that is present immediately after the module id and the module version of the DII change; and
transmitting the section to a terrestrial digital broadcasting network.

7. A non-transitory computer-readable recording medium storing a program therein that causes a computer to perform:
receiving frame data that is input in real time, the frame data including broadcast content;
performing a predetermined encapsulation process on the frame data and forms a sub-network data unit;
blocking the frame data encapsulated to be the sub-network data unit into a DDB (Download Data Block) being a predetermined block unit, the DDB including a module id that is an identifier for the DDB and a module version that is a version number of the DDB;
generating a DII (Download Information Indication) being information concerning the DDB, the DII including the module id and the module version for a corresponding DDB;
updating the module ids and the module versions of the DDB and the DII;
outputting the DDB and the DII as a section based on a predetermined data carousel scheme, the DII output being followed by the DDB output in a given interval, which is repeated, two DIIs having an identical combination of the module id and the module version are always transmitted in a row, and outputting the DDB that is present immediately after the module id and the module version of the DII change; and
transmitting the section to a terrestrial digital broadcasting network.

* * * * *